Patented July 1, 1930

1,768,803

UNITED STATES PATENT OFFICE

CHARLES J. STROSACKER AND JAMES I. JONES, OF MIDLAND, MICHIGAN, ASSIGNORS TO THE DOW CHEMICAL COMPANY, OF MIDLAND, MICHIGAN, A CORPORATION OF MICHIGAN

METHOD OF RECOVERING CARBON BISULPHIDE

No Drawing.    Application filed January 25, 1926. Serial No. 83,711.

The method still largely employed for the manufacture of carbon bisulphide consists in passing the vapor of sulphur over red hot charcoal or coke. Such sulphur vapor combines directly with the red hot carbon to form the carbon bisulphide along with various impurities, the principal one of which is hydrogen sulphide gas due to the presence of hydrogen in the charcoal. This hydrogen sulphide even after going through the condensers, which are employed to condense the carbon bisulphide to liquid form, is not condensed and carries with it considerable carbon bisulphide, the amount of the latter depending on the temperature to which the products of the original reaction are subjected, and there will accordingly be a corresponding loss of carbon bisulphide. The object of the present invention is to eliminate this loss by bringing the hydrogen sulphide into contact with a suitable reagent whereby it is absorbed but the carbon bisulphide carried therewith is unacted upon. Such carbon bisulphide may then be easily condensed.

To the accomplishment of the foregoing and related ends, the invention then consists of the steps hereinafter fully described and particularly pointed out in the claims, the following description setting forth but one of the various ways in which the principle of the invention may be carried out.

The preferred reagent which we employ to absorb the hydrogen sulphide in the manner hereinbefore indicated is caustic soda (NaOH) because there are then produced by-products of considerable value, viz, sodium sulphide or sodium hydrogen sulphide, according to the following reaction, viz:—

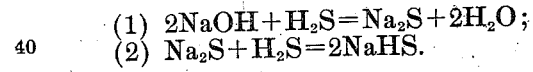

The caustic soda is employed in the form of a water solution, the strength of which may vary, but preferably such solution will consist of approximately 25 parts of caustic soda to approximately 75 parts of water.

After the hydrogen sulphide has been thus absorbed, the residual carbon bisulphide may be readily condensed in the usual manner, that is, providing such bisulphide is still in the form of a vapor. If the absorbent caustic solution is not warm enough to permit the carbon bisulphide to remain volatilized, it of necessity remains in such solution and will then be separated therefrom by distillation, or, if preferred, it can be drawn off as a liquid inasmuch as it is not soluble in such solution.

Any hydroxide or carbonate with which hydrogen sulphide will chemically react can be used to recover the carbon bisulphide in the manner hereinbefore described, and the resultant loss of the bisulphide residuum, which has heretofore been burned with the other gaseous impurities resulting from the original reaction, is avoided.

It will be understood, of course, that the present improved method of recovering carbon bisulphide is not necessarily limited to the case where this compound is produced by the particular method hereinbefore mentioned as the one generally or largely employed for the production of such compounds. In other words, the present method of recovery is applicable to any process of manufacture of carbon bisulphide in which gaseous by-products, including hydrogen sulphide, result inasmuch as such hydrogen sulphide will necessarily carry with it a certain amount of carbon bisulphide vapor.

While the process has been described as one primarily for the recovery of carbon bisulphide, it may equally well be regarded as a process for the recovery, in the form of sodium sulphide or its equivalent, of the sulphur present as hydrogen sulphide in the exit gases.

It may also be noted that instead of passing such exit gases into a water solution of caustic soda, they may be passed through a body of water and caustic soda subsequently added. The water, if sufficient in amount, will absorb substantially all of the hydrogen sulphide but has no such effect on carbon bisulphide, and the addition of the caustic to the water, after it has absorbed a sufficient amount of the hydrogen sulphide will result in the formation of sodium sulphide, as before.

Still another satisfactory procedure involving the use of a chemical absorbing agent is to replace caustic soda with sodium sulphide in the method as first described above. In other words, hydrogen sulphide may be absorbed in sodium sulphide to form sodium hydrogen sulphide and the latter is then subsequently treated with caustic soda to again form sodium sulphide which is used for further absorption of hydrogen sulphide The reactions occurring may be represented by the following equations, viz:—

(3) $Na_2S + H_2S = 2NaHS$;
(4) $NaHS + NaOH = Na_2S + H_2O$.

In the foregoing modification of the method caustic soda is still used in effect as the chemical absorbing agent, although not directly used in absorbing the hydrogen sulphide. Such modified form of procedure is specifically claimed in our copending application Serial No. 153,208, filed December 7, 1926.

Other modes of applying the principle of our invention may be employed instead of the one explained, change being made as regards the process or method herein disclosed, provided the step or steps stated by any of the following claims or the equivalent of such stated step or steps be employed.

We therefore particularly point out and distinctly claim as our invention:—

1. A process of making carbon bisulphide and an alkali metal sulphide which comprises passing the vapor of sulphur in contact with carbon at a red heat, condensing from the reaction products a major portion of the carbon bisulphide thereby formed, subjecting the residual non-condensible gaseous mixture of carbon bisulphide and hydrogen sulphide to the action of an aqueous alkaline solution to absorb such hydrogen sulphide, and separating therefrom such residual carbon bisulphide.

2. A process of making carbon bisulphide and an alkali metal sulphide which comprises passing the vapor of sulphur in contact with carbon at a red heat, condensing from the reaction products a major portion of the carbon bisulphide thereby formed, subjecting the residual non-condensible gaseous mixture of carbon bisulphide and hydrogen sulphide to the action of an aqueous alkaline solution to absorb such hydrogen sulphide, and condensing such residual carbon bisulphide.

3. A process of making carbon bisulphide and sodium sulphide which comprises passing the vapor of sulphur in contact with carbon at a red heat, condensing from the reaction products a major portion of the carbon bisulphide thereby formed, subjecting the residual non-condensible gaseous mixture of carbon bisulphide and hydrogen sulphide to the action of an aqueous sodium hydroxide solution to absorb such hydrogen sulphide, and condensing such residual carbon bisulphide.

Signed by us this 30th day of December, 1925.

CHARLES J. STROSACKER.
JAMES I. JONES.